United States Patent
Baik et al.

(10) Patent No.: US 10,619,006 B2
(45) Date of Patent: Apr. 14, 2020

(54) DUAL METAL CYANIDE CATALYST, PREPARATION METHOD THEREFOR, AND METHOD FOR PREPARING POLYCARBONATE POLYOL BY USING CATALYST

(71) Applicants: POSCO, Pohang-si, Gyeongsangbuk-do (KR); RESEARCH INSTITUTE OF INDUSTRIAL SCIENCE & TECHNOLOGY, Pohang-si, Gyeongsangbuk-do (KR)

(72) Inventors: Joon-Hyun Baik, Pohang-si (KR); Il Kim, Busan (KR); Seong-Hwan Yun, Busan (KR); Jae-Hee Ha, Pohang-si (KR); Seong-Jin Byeon, Ulsan (KR)

(73) Assignees: POSCO, Pohang-si, Gyeongsangbuk-Do (KR); RESEARCH INSTITUE OF INDUSTRIAL SCIENCE AND TECHNOLOGY, Pohang-si, Gyeongsangbuk-Do (KR)

( * ) Notice: Subject to any disclaimer, the term of this patent is extended or adjusted under 35 U.S.C. 154(b) by 0 days.

(21) Appl. No.: 16/065,787

(22) PCT Filed: Dec. 21, 2016

(86) PCT No.: PCT/KR2016/015028
§ 371 (c)(1),
(2) Date: Jun. 22, 2018

(87) PCT Pub. No.: WO2017/111469
PCT Pub. Date: Jun. 29, 2017

(65) Prior Publication Data
US 2019/0010284 A1    Jan. 10, 2019

(30) Foreign Application Priority Data
Dec. 24, 2015  (KR) .................. 10-2015-0185899

(51) Int. Cl.
*C08G 64/34*    (2006.01)
*B01J 31/22*    (2006.01)
(Continued)

(52) U.S. Cl.
CPC .............. *C08G 64/34* (2013.01); *B01J 27/26* (2013.01); *B01J 31/04* (2013.01); *B01J 31/068* (2013.01);
(Continued)

(58) Field of Classification Search
CPC . B01J 31/22; B01J 31/04; B01J 31/068; B01J 27/26
See application file for complete search history.

(56) References Cited

U.S. PATENT DOCUMENTS 4,500,704 A    2/1985    Kruper
5,998,327 A    12/1999    Hofmann et al.
(Continued)

FOREIGN PATENT DOCUMENTS

JP    H11-049792 A    2/1999
JP    2002-513818 A    5/2002
(Continued)

OTHER PUBLICATIONS

International Search Report issued in International Application No. PCT/KR2016/015028 dated Mar. 16, 2017.
(Continued)

*Primary Examiner* — Shane Fang
(74) *Attorney, Agent, or Firm* — Morgan, Lewis & Bockius LLP

(57)    ABSTRACT

The present invention relates to a double metal cyanide catalyst comprising a polyether compound, a metal salt, a metal cyanide salt, and an organic complexing agent having an acetate group or a tartrate group; a preparation method therefor; and a method for preparing a polycarbonate
(Continued)

polyether polyol by copolymerizing carbon dioxide and an epoxy compound in the presence of the catalyst. According to the present invention, the double metal cyanide catalyst has excellent in catalytic activity and has a short catalytic activity induction time, according to an embodiment of the present invention, the process for preparing the catalyst of the present invention is eco-friendly and simple in process, since an amount of the organic complexing agent to be used is small, and has a simple process.

6 Claims, 2 Drawing Sheets

(51) Int. Cl.
*B01J 27/26* (2006.01)
*B01J 31/06* (2006.01)
*B01J 31/04* (2006.01)
*C08G 64/02* (2006.01)

(52) U.S. Cl.
CPC .......... *B01J 31/22* (2013.01); *C08G 64/0208* (2013.01); *C08G 64/0291* (2013.01)

(56) References Cited

U.S. PATENT DOCUMENTS

| | | |
|---|---|---|
| 6,063,897 A | 5/2000 | Le-Khac |
| 2008/0177025 A1 | 7/2008 | Hofmann |
| 2014/0256908 A1 | 9/2014 | Hofmann et al. |

FOREIGN PATENT DOCUMENTS

| | | |
|---|---|---|
| JP | 2014-520938 A | 8/2014 |
| KR | 10-1999-013899 A | 2/1999 |
| KR | 10-2008-0067971 A | 7/2008 |
| KR | 10-2012-0042796 A | 5/2012 |
| KR | 10-2014-0042167 A | 4/2014 |
| KR | 10-1466803 B1 | 11/2014 |

OTHER PUBLICATIONS

Japanese Office Action dated May 28, 2019 issued in Japanese Patent Application No. 2018-532696.

[FIG. 1]
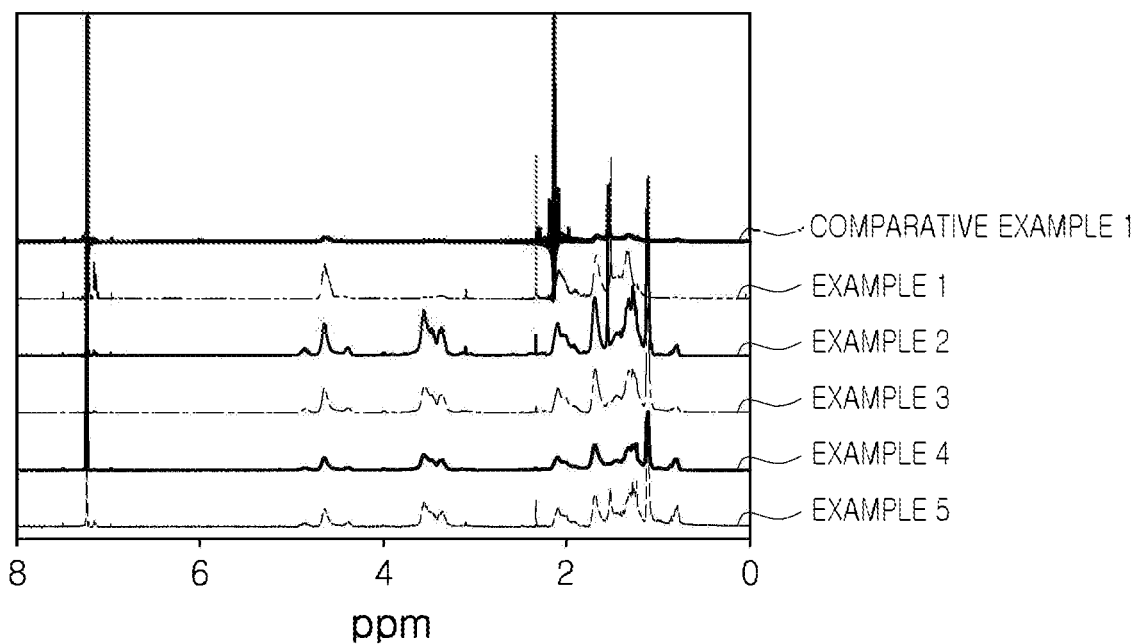

[FIG. 2]
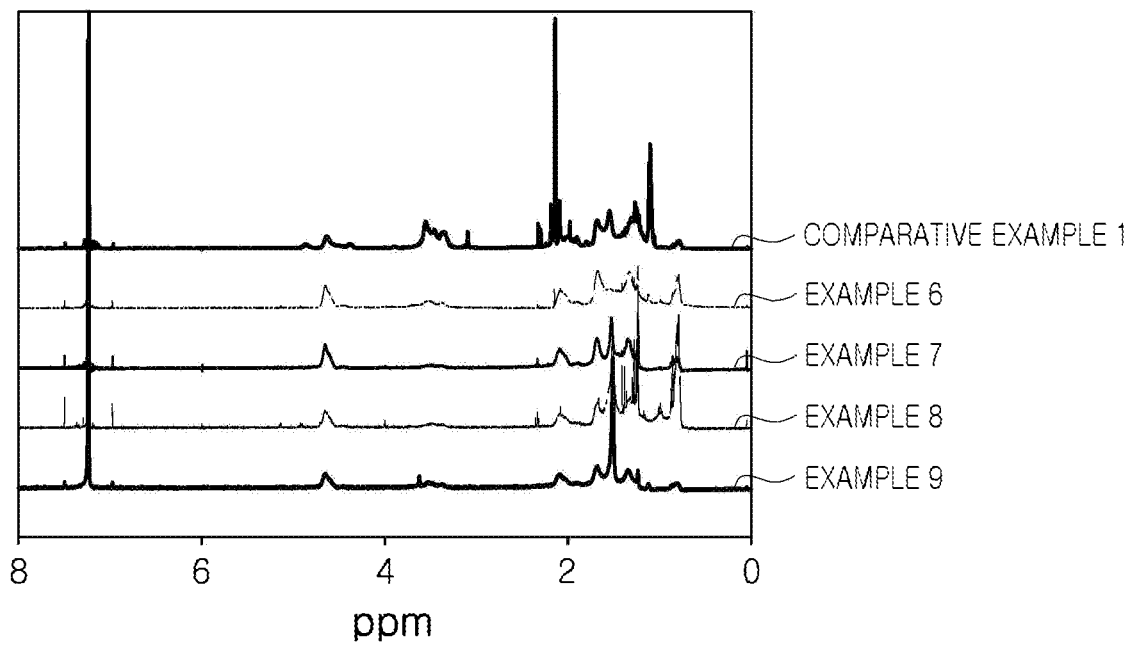
[FIG. 3]
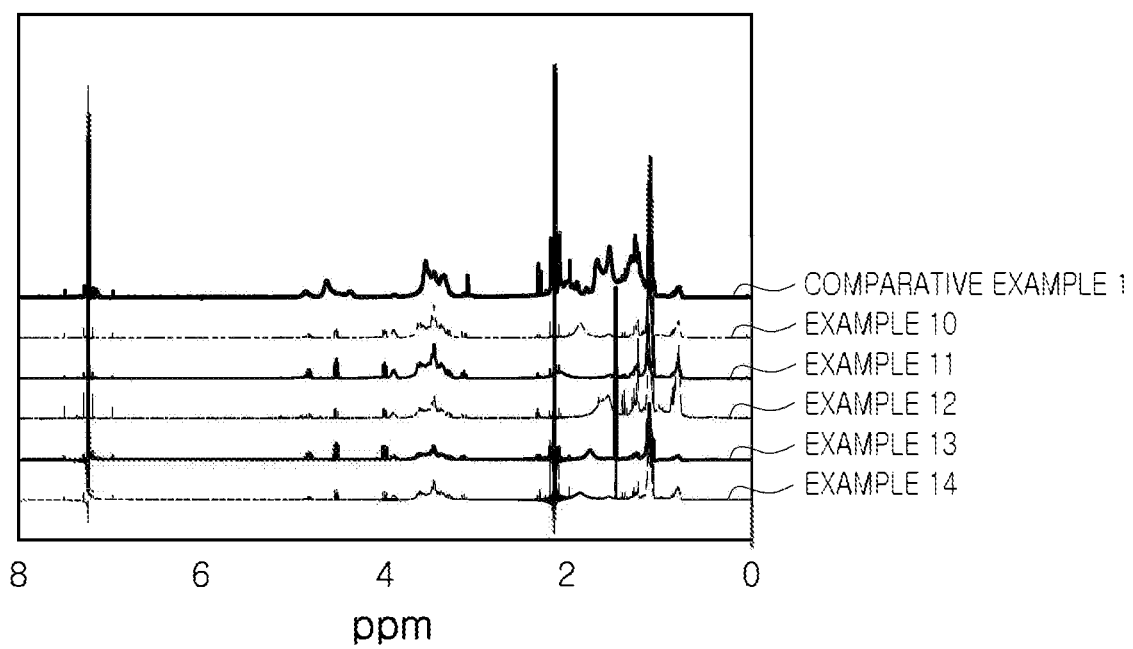

DUAL METAL CYANIDE CATALYST, PREPARATION METHOD THEREFOR, AND METHOD FOR PREPARING POLYCARBONATE POLYOL BY USING CATALYST

CROSS REFERENCE

This application is the U.S. National Phase under 35 U.S.C. § 371 of International Application No. PCT/KR2016/015028 filed on Dec. 21, 2016, which claims the benefit of Korean Application No. 10-2015-0185899 filed on Dec. 24, 2015, the entire contents of each are hereby incorporated by reference.

TECHNICAL FIELD

The present invention relates to a double metal cyanide catalyst, a preparation method therefor, and a method for preparing a polycarbonate polyether polyols by using the catalyst.

BACKGROUND ART

Polyether polyols are raw materials able to be industrially produced in large quantities, and are generally used as starting materials for the production of polyurethane, together with polyisocyanates. Conventionally, basic metal hydroxides, such as potassium hydroxide (KOH), have been used as catalysts for producing the polyether polyols. However, an amount of monofunctional polyether (monol) having a terminal double bond has increased, such that a very disadvantageous problem for the production of polyurethane has occurred. On the other hand, when a double metal cyanide catalyst is used as a catalyst for production of the polycarbonate polyether polyol, not only an amount of monol may be relatively reduced, but also a rate of an addition reaction of cyclohexene oxide (CHO) or propylene oxide (PO) may be increased. Further, a polycarbonate polyether polyol prepared by using the catalyst may be processed to provide high quality polyurethanes (e.g., coatings, elastomers, sealants, foams and adhesives).

However, conventional double metal cyanide catalysts included an excessive amount of an organic complexing agent, causing environmental pollution, and had a problem of low economic efficiency due to a complicated synthesis process and a long manufacturing time originating therefrom. In addition, a relative high level of energy may be required to fix carbon dioxide, which is a very thermodynamically stable material, and, thus, there is a need to use a high activity catalyst.

Korean Patent Publication No. 10-2012-0042796 discloses that a method of preparing a solid double metal cyanide or a multi-metal cyanide catalyst is characterized by using a lactate compound as a complexing agent. However, since the catalyst is not highly selective to carbon dioxide, there is a problem that it is difficult to control functional group in an end product. In addition, Korean Patent Publication No. 10-2014-0042167 discloses a method for producing polycarbonate by copolymerizing carbon dioxide and an epoxy compound in the presence of a double metal cyanide catalyst, simultaneously comprising an organic complexing agent containing a ketone group and a hydroxyl group. In this case, it is difficult to control the functionality to the end product produced by using the catalyst, and it is also difficult to use the end product as a high-grade polyurethane material.

DISCLOSURE

Technical Problem

An aspect of the present invention may provide a double metal cyanide catalyst having excellent catalytic activity and a short catalytic activity induction time.

In addition, an aspect of the present invention may also provide a process for preparing a double metal cyanide catalyst having a small amount of an organic complexing agent to be eco-friendly and simple in terms of process.

Further, an aspect of the present invention may also provide a process for preparing a polycarbonate polyether polyol, using the double metal cyanide catalyst.

Technical Solution

According to an aspect of the present invention, a double metal cyanide catalyst includes a polyether compound, a metal salt, a metal cyanide salt, and an organic complexing agent having an acetate group or a tartrate group.

The metal salt and the organic complexing agent may be present in a weight ratio of 1:5 to 1:10.

The amount of the polyether compound may be 0.1 to 30 parts by weight, based on 100 parts by weight of the double metal cyanide catalyst.

The organic complexing agent may be selected from the group consisting of ethylene glycol monomethyl ether acetate (MEA), ethylene glycol monoethyl ether acetate (EEA), ethylene glycol monobutyl ether acetate (BEA), diethylene glycol monoethyl ether acetate (DGEEA), ethylene glycol diacetate (EGD), (+)-dimethyl-L-tartrate (MT), (+)-diethyl-L-tartrate (ET), (+)-diisopropyl-L-tartrate (IPT), and (+)-dibutyl-L-tartrate (BT).

The polyether compound may be a polyether polyol.

The polyether polyol may be selected from the group consisting of poly(ethylene glycol), poly(propylene glycol), a block copolymer of ethylene oxide and propylene oxide, a butylene oxide polymer and a hyperbranched polyglycidol.

According to another aspect of the present invention, a preparation method of a double metal cyanide catalyst includes: producing a first mixed solution comprising an organic complexing agent having an acetate group or a tartrate group, a metal salt, and distilled water, supplying a metal cyanide salt and distilled water to the first mixed solution to produce a second mixed solution, supplying the organic complexing agent and a polyether compound to the second mixed solution to produce a third mixed solution, and centrifuging the third mixed solution to obtain a precipitate.

The preparation method may further include washing and drying the precipitate.

The preparation method may further include: supplying the organic complexing agent and distilled water to the precipitate to prepare a fourth mixed solution, supplying the organic complexing agent and the polyether compound to the fourth mixed solution to prepare a fifth mixed solution, and centrifuging the fifth mixed solution to obtain a precipitate.

The preparation method may further include washing and drying the precipitate.

According to another aspect of the present invention, a method for preparing a polycarbonate polyether polyol, includes copolymerizing carbon dioxide and an epoxy compound in the presence of the double metal cyanide catalyst to produce the polycarbonate polyether polyol.

The epoxy compound may be one or more selected from the group consisting of an alkylene oxide having 2 to 20 carbon atoms, a cycloalkene oxide having 4 to 20 carbon atoms, and a styrene oxide having 1 to 20 carbon atoms.

Advantageous Effects

According to an aspect of the present invention, the double metal cyanide catalyst may be excellent in terms of catalytic activity, and may have a short catalytic activity induction time. The process for preparing the catalyst of the present invention may be environmentally friendly and simple in process, since an amount of the organic complexing agent to be used is small, and has a simple process, and a polycarbonate polyether polyol prepared by using the catalyst has effects of a low degree of unsaturation and a high content of carbonate.

DESCRIPTION OF DRAWINGS

FIGS. 1 to 3 are graphs showing results of H-NMR spectroscopic analysis of polycarbonate polyether polyols prepared in Examples 1 to 14 and Comparative Example 1.

BEST MODE FOR INVENTION

Hereinafter, preferred embodiments of the present invention will be described with reference to various embodiments. However, the embodiments of the present invention may be modified to have various other forms, and the scope of the present invention may be not limited to the embodiments described below.

The present invention relates to a double metal cyanide catalyst, a preparation method therefor, and a method for preparing polycarbonate polyether polyol by using the catalyst. The double metal cyanide catalyst may comprise an organic complexing agent having an acetate group or a tartrate group, a polyether compound, a metal salt, and a metal cyanide salt.

Conventional double metal cyanide catalysts have contained an excess amount of an organic complexing agent, such as alcohols, aldehydes, ketones, ethers, esters, amides, ureas, nitriles, sulfates, or mixtures thereof, and, among them, ether or water-soluble aliphatic alcohol has been preferred. Particularly, tert-butyl alcohol (t-BuOH) has been used. However, when the catalyst is prepared by using an organic complexing agent, such as tert-butyl alcohol, the synthesis process may be complicated, taken a long manufacturing time, and cause environmental pollution due to usage of an excessive amount of organic complexing agents.

With respect to such problems, the double metal cyanide catalyst of present invention may include an acetate group or a tartrate group to have a relatively high catalytic activity and a relatively low catalytic activity induction time, while maintaining the advantages of the conventional catalysts.

The organic complexing agent is not particularly limited, as long as it contains an acetate group or a tartrate group. For example, the organic complexing agent may be one or more selected from the group consisting of ethylene glycol monomethyl ether acetate (MEA), ethylene glycol monoethyl ether acetate (EEA), ethylene glycol monobutyl ether acetate (BEA), diethylene glycol monoethyl ether acetate (DGEEA), ethylene glycol diacetate (EGD), (+)-dimethyl-L-tartrate (MT), (+)-diethyl-L-tartrate (ET), (+)-diisopropyl-L-tartrate (IPT), and (+)-dibutyl-L-tartrate (BT).

On the other hand, conventional double metal cyanide catalysts using tert-butyl alcohol as an organic complexing agent have caused environmental pollution problems through the use of an organic complexing agent in an amount of about 40 or more times the amount of the metal salt. Since the double metal cyanide catalyst of the present invention has a weight ratio of an organic complexing agent to zinc chloride of only 1:5 to 1:10, an amount of the organic complexing agent to be used may be lower than the conventional double metal cyanide catalysts using the butyl alcohol as the organic complexing agent, to be eco-friendly.

The polyether compound contained in the double metal cyanide catalyst, which may be an embodiment of the present invention, may be a compound prepared by ring-opening polymerization of a cyclic ether compound, an epoxy polymer or an oxetane polymer. In this case, a terminal group may be a hydroxyl group, an amine group, an ester group, or an ether group. A polyether polyol having a hydroxyl functionality of 1 to 8 may preferably be provided.

The polyether polyol may be one or more selected from the group consisting of, for example, poly(ethylene glycol), poly(propylene glycol), a block copolymer of ethylene oxide and propylene oxide, a butylene oxide polymer and a hyperbranched polyglycidol. The block copolymer of ethylene oxide and propylene oxide may be, for example, a poly(ethylene oxide)-poly(propylene oxide)-poly(ethylene oxide) terpolymer, an oxide-capped poly(oxypropylene)p-olyol, or ethylene oxide-propylene oxide polyol. The butylene oxide polymer may be butylene glycol, branched glycerol having a hydroxyl group having a weight average molecular weight of 1,000 to 50,000, or a copolymer thereof.

An amount of the polyether compound may preferably be 0.1 to 30 parts by weight, based on 100 parts by weight of the double metal cyanide catalyst, to realize a high degree of catalytic activity. When an amount of the polyether compound is less than 0.1 part by weight, an activity of a catalyst may be relatively low, since the catalyst may not effectively bind to an active site of the double metal cyanide catalyst having a lattice structure. When an amount of the polyether compound exceeds 30 parts by weight, an activity of a catalyst may be relatively low, since the catalyst may not effectively bind to an active site of the double metal cyanide catalyst having a lattice structure. Therefore, it may preferably be 0.1 to 30 parts by weight.

A metal salt and a metal cyanide salt contained in the double metal cyanide catalyst may be dissolved in water and reacted. Specifically, the double metal cyanide catalyst may be a reaction product of a water-soluble metal salt and a water-soluble metal cyanide salt.

The water-soluble metal salt may have a general formula of $M(X)_n$. In this case, M may be selected from the group consisting of Zn(II), Fe(II), Ni(II), Mn(II), Co(II), Sn(II), Pb(II), Fe(III), Mo(IV), Mo(VI), Al(II), V(V), V(IV), Sr(II), W(IV), W(VI), Cu(II), and Cr(III). Specifically, it may preferably be Zn(II), Fe(II), Co(II), or Ni(II). X may be an anion selected from the group consisting of halides, hydroxides, sulfates, carbonates, cyanides, oxalates, thiocyanates, isocyanates, isothiocyanates, carboxylates, and nitrates. Here, n may be an integer of 1 to 3, and satisfy a valence of M. For example, the metal salt may be zinc chloride, zinc bromide, zinc acetate, zinc acetonylacetonate, zinc benzoate, zinc nitrate, iron (II) bromide, cobalt (II) chloride, cobalt (II) thiocyanate, nickel (II) formate, or nickel (II) nitrate.

The water-soluble metal cyanide salt may have a structural formula of $(Y)_a M' (CN)_b (A)_c$. M may be selected from the group consisting of Fe(II), Fe(III), Co(II), Co(III), Cr(III), Mn(II), Mn(III), Ir(III), Ni(II), Rh(III), Ru(II), V(V), and V(IV). In particular, Co(II), Co(III), Fe(II), Fe(III), Cr(III), Ir(III), or Ni(II) may be preferred. Y may be an alkali metal ion or an alkaline metal ion. A may be an anion selected from the group consisting of halides, hydroxides, sulfates, carbonates, oxalates, cyanides, thiocyanates, isocyanates, isothiocyanates, carboxylates, and nitrates. Also, preferably, a and b may be integers greater than 1, and a sum of charges of a, b, and c may be balanced with charge of M'. For example, the metal cyanide salt may be potassium hexacyanocobaltate(III), potassium hexacyanoferrate(II), potassium hexacyanoferrate(III), calcium hexacyanocobaltate(II), or lithium hexacyanoferrate(II).

The present invention may provide a preparation method of a double metal cyanide catalyst.

One embodiment of the present invention may provide a method for preparing a metal salt, comprising: producing a first mixed solution comprising an organic complexing agent having an acetate group or a tartrate group, a metal salt, and distilled water, supplying a metal cyanide salt and distilled water to the first mixed solution to produce a second mixed solution, supplying the organic complexing agent and a polyether compound to the second mixed solution to produce a third mixed solution, and centrifuging the third mixed solution to obtain a precipitate.

Specifically, an organic complexing agent having an acetate group or a tartrate group, a metal salt, and distilled water may be supplied to a beaker. Then, they may be mixed, and thoroughly stirred by a mechanical stirrer to prepare a first mixed solution. Also, a solution in which a metal cyanide salt and distilled water are mixed may be prepared in another beaker, and then supplied to the first mixed solution to prepare a second mixed solution. The organic complexing agent and distilled water may be mixed with the second mixed solution, and may be further stirred to obtain a third mixed solution. The third mixed solution thus obtained may be separated by high-speed centrifugation to obtain a precipitate.

The double metal cyanide catalyst according to the present invention may be included in the precipitate. The precipitate may be washed and dried to prepare the double metal cyanide catalyst.

The preparation method of a double metal cyanide catalyst of the present invention may have a small amount of an organic complexing agent to be used, and may be eco-friendly, simple and effective. Further, a double metal cyanide catalyst prepared by the preparation method may have excellent catalytic activity, and a short catalytic activity induction time.

According to an embodiment of the present invention, an additional process may be performed before washing the precipitate obtained by centrifuging the third mixed solution, to obtain a double metal cyanide catalyst having better catalytic activity.

Specifically, the preparation method may further include: a) supplying the organic complexing agent and distilled water to the precipitate to prepare a fourth mixed solution, b) supplying the organic complexing agent and the polyether compound to the fourth mixed solution to prepare a fifth mixed solution, and c) centrifuging the fifth mixed solution to obtain a precipitate. Also, d) a precipitate obtained by centrifuging the fifth mixed solution may be washed and dried to obtain a double metal cyanide catalyst having improved catalytic activity.

Further, the fifth mixed solution may be further subjected to the operations of a) to d), such that a total of three centrifugation processes are performed. In a case of conducting the centrifugation process three or more times, it may be possible to easily separate impurities such as potassium ions, chloride ions, complexing agents, co-complexing agents, or the like, which are not reacted at the time of catalyst synthesis. Therefore, a more pure catalyst may be prepared to increase an activity of the catalyst.

The present invention may provide a method for preparing a polycarbonate polyether polyol using a double metal cyanide catalyst.

According to one embodiment of the present invention, a polycarbonate polyether polyol may be prepared by copolymerizing carbon dioxide and an epoxy compound in the presence of the double metal cyanide catalyst.

The method for preparing a polycarbonate polyether polyol may be carried out comprising using a high pressure reactor, introducing a double metal cyanide catalyst of the present invention into a trap installed in an upper portion of the high pressure reactor, and purging an internal space of the high pressure reactor by using carbon dioxide gas, to remove active gas present in the reactor and cause explosion. Thereafter, an epoxy compound may be injected into the reactor to increase a pressure, a stirring speed and a temperature in the reactor, and the pressure may be maintained by continuously supplying carbon dioxide. Therefore, a catalyst trapped in the trap located at the upper portion of the reactor may be fallen on a bottom of the reactor to facilitate a copolymerization reaction of the epoxy compound and carbon dioxide. After the polymerization reaction, the catalyst and the polymerization product may be separated using a vacuum glass filter, and a polycarbonate may be obtained by removing unreacted epoxy compounds through a vacuum drying.

The epoxy compound used for the polycarbonate polyether polyol is not particularly limited, but may be one or more selected from the group consisting of an alkylene oxide having 2 to 20 carbon atoms, a cycloalkene oxide having 4 to 20 carbon atoms, and a styrene oxide having 1 to 20 carbon atoms.

MODE FOR INVENTION

Hereinafter, the present invention will be described more specifically with reference to specific examples. The following examples are provided to aid in gaining an understanding of the present invention, and the scope of the present invention is not limited thereto.

Example 1

(1) Preparation of Double Metal Cyanide Catalyst (DMC-MEA)

12 g of zinc chloride, 46 mL of distilled water, and 13 mL of 2-methoxyethyl acetate were mixed in a first beaker (Solution 1), and, in a second beaker, 1.3 g of potassium hexacyanocobaltate was dissolved in 16 mL of distilled water (Solution 2). In a third beaker, 0.97 g of poly(ethylene glycol)-Block-Poly(propylene glycol)-Block-poly(ethylene glycol) was dissolved in 12 mL of 2-methoxyethyl acetate (Solution 3). Solution 1 was introduced into a spherical flask, and Solution 2 was added thereto for 1 hour while stirring at 50° using a mechanical stirrer. Thereafter, Solution 3 was added, and reacted for 3 minutes. A solution after the reaction was isolated by high speed centrifugation to obtain a solid precipitate. 20 mL of distilled water and 12 mL of 2-methoxyethyl acetate were added to the precipitate, and the mixture was reacted at 50° for 1 hour while mixing using a mechanical stirrer. After the reaction, a mixed solution of 0.485 g of poly(ethylene glycol)-Block-Poly(propylene glycol)-Block-poly(ethylene glycol) in 6 mL of 2-methoxyethyl acetate was added, and stirred for 3 minutes, and solid precipitates were again isolated by high-speed centrifugation. 20 mL of distilled water and 6 mL of 2-methoxyethyl acetate were added to the precipitate, and the mixture was reacted for 1 hour at 50° while mixing using a mechanical stirrer. After the reaction, a mixed solution of 2 g of poly(ethylene glycol)-Block-Poly(propylene glycol)-Block-poly(ethylene glycol) in 8 mL of 2-methoxyethyl acetate was added, stirred for 3 minutes, and solid precipitates were further isolated by high-speed centrifugation. The precipitate was washed twice with 100 mL of distilled water, washed once with 50 mL of 2-methoxyethyl acetate, and dried to a constant weight under a vacuum of 80, 30 in. Hg to obtain a double metal cyanide catalyst (DMC-MEA).

(2) Preparation of Polycarbonate Polyether Polyol 10 mg of the DMC-MEA catalyst was inserted into a tube for catalyst injection, and then disposed in a 160 ml high-pressure reactor. 10 mL of initiator PPG 400D was added to the reactor, and the reactor was bound. Thereafter, the high-pressure reactor was purged with nitrogen gas for 2 hours, and the reactor was heated to 105□ to remove as much of the initiator and moisture in the reactor as possible. A trace amount of carbon dioxide gas, 20 mL of cyclohexene oxide, and 10 mL of toluene were added to the reactor. Then, a vent line and an inlet were closed. After the reactor was heated to 115°, carbon dioxide gas was injected to increase the pressure of carbon dioxide in the reactor to 43.5 bars. When the temperature and pressure were stabilized, stirring was started, and polymerization was carried out for 3 hours. After 3 hours, the injection and heating of carbon dioxide gas were stopped, residual carbon dioxide gas in the reactor was removed, and the bound reactor was released to obtain a reaction product. The reaction product was diluted in toluene, and filtered through filter paper to remove the catalyst. Then, after vacuum drying at 110□ for 8 hours, a polycarbonate polyether polyol was obtained.

Example 2

A double metal cyanide catalyst (DMC-EEA) was prepared in the same manner as Example 1, except that ethoxyethyl acetate was used, instead of 2-methoxyethyl acetate.

Further, a polycarbonate polyether polyol was prepared in the same manner as Example 1, except that the DMC-EEA catalyst was used, instead of the DMC-MEA catalyst.

Example 3

A double metal cyanide catalyst (DMC-BEA) was prepared in the same manner as Example 1, except that 2-butoxyethyl acetate was used, instead of 2-methoxyethyl acetate.

Further, a polycarbonate polyether polyol was prepared in the same manner as Example 1, except that the DMC-BEA catalyst was used, instead of the DMC-MEA catalyst.

Example 4

A double metal cyanide catalyst (DMC-DGEEA) was prepared in the same manner as Example 1, except that diethylene glycol monoethyl ether acetate was used, instead of 2-methoxyethyl acetate.

In addition, a polycarbonate polyether polyol was prepared in the same manner as Example 1, except that the DMC-DGEEA catalyst was used, instead of the DMC-MEA catalyst.

Example 5

A double metal cyanide catalyst (DMC-EGD) was prepared in the same manner as Example 1, except that ethylene glycol diacetate was used, instead of 2-methoxyethyl acetate.

Further, a polycarbonate polyether polyol was prepared in the same manner as Example 1, except that the DMC-EGD catalyst was used, instead of the DMC-MEA catalyst.

Example 6

A double metal cyanide catalyst (DMC-MT) was prepared in the same manner as Example 1, except that (+)-dimethyl-L-tartrate was used, instead of 2-methoxyethyl acetate.

Further, a polycarbonate polyether polyol was prepared in the same manner as Example 1, except that the DMC-MT catalyst was used, instead of the DMC-MEA catalyst.

Example 7

A double metal cyanide catalyst (DMC-ET) was prepared in the same manner as Example 1, except that (+)-diethyl-L-tartrate was used, instead of 2-methoxyethyl acetate.

In addition, a polycarbonate polyether polyol was prepared in the same manner as Example 1, except that the DMC-ET catalyst was used, instead of the DMC-MEA catalyst.

Example 8

A double metal cyanide catalyst (DMC-IPT) was prepared in the same manner as Example 1, except that (+)-diisopropyl-L-tartrate was used, instead of 2-methoxyethyl acetate.

Further, a polycarbonate polyether polyol was prepared in the same manner as Example 1, except that the DMC-IPT catalyst was used, instead of the DMC-MEA catalyst.

Example 9

A double metal cyanide catalyst (DMC-BT) was prepared in the same manner as Example 1, except that (+)-dibutyl-L-tartrate was used, instead of 2-methoxyethyl acetate.

Further, a polycarbonate polyether polyol was prepared in the same manner as Example 1, except that the DMC-BT catalyst was used, instead of the DMC-MEA catalyst.

Example 10

A polycarbonate polyether polyol was prepared in the same manner as Example 1 (using a DMC-MEA catalyst), except that propylene oxide (PO) was used, instead of cyclohexene oxide (CHO).

Example 11

A polycarbonate polyether polyol was prepared in the same manner as Example 2 (using a DMC-EEA catalyst), except that propylene oxide (PO) was used, instead of cyclohexene oxide (CHO).

Example 12

A polycarbonate polyether polyol was prepared in the same manner as Example 3 (using a DMC-BEA catalyst), except that propylene oxide (PO) was used, instead of cyclohexene oxide (CHO).

Example 13

A polycarbonate polyether polyol was prepared in the same manner as Example 4 (using a DMC-DGEEA catalyst), except that propylene oxide (PO) was used, instead of cyclohexene oxide (CHO).

Example 14

A polycarbonate polyether polyol was prepared in the same manner as Example 5 (using a DMC-EGD catalyst), except that propylene oxide (PO) was used, instead of cyclohexene oxide (CHO).

Comparative Example 1

(1) Preparation of Double Metal Cyanide Catalyst (DMC-5)

30 g of zinc chloride, 69 mL of distilled water, and 115.5 mL of tert-butyl alcohol were mixed in a first beaker (Solution 1), and, in a second beaker, 3.15 g of potassium hexacyanocobaltate was dissolved in 42 mL of distilled water (Solution 2). In a third beaker, 3.5 g of poly(ethylene glycol)-Block-Poly(propylene glycol)-Block-poly(ethylene glycol) was dissolved in 20 mL of tert-butyl alcohol (Solution 3). Solution 1 was introduced into a spherical flask, and Solution 2 was added thereto for 1 hour while stirring using a mechanical stirrer. Thereafter, Solution 3 was added, and reacted for 3 minutes. A solution after the reaction was isolated by high speed centrifugation to obtain a solid precipitate. 46 mL of distilled water and 104 mL of tert-butyl alcohol were added to the precipitate, and the mixture was reacted at 50° for 1 hour while mixing using a mechanical stirrer. After the reaction, 0.85 g of poly(ethylene glycol)-Block-Poly(propylene glycol)-Block-poly(ethylene glycol) was added, and stirred for 3 minutes, and solid precipitates were again isolated by high-speed centrifugation. 77.75 mL of tert-butyl alcohol was added to the precipitate, and the mixture was reacted for 1 hour at 50° while mixing using a mechanical stirrer. After the reaction, 0.45 g of poly(ethylene glycol)-Block-Poly(propylene glycol)-Block-poly(ethylene glycol) was added, stirred for 3 minutes, and solid precipitates were further isolated by high-speed centrifugation. The precipitate was washed twice with 100 mL of distilled water, washed once with 50 mL of tert-butyl alcohol, and dried to a constant weight under a vacuum of 80, 30 in. Hg to obtain a double metal cyanide catalyst (DMC-5).

(2) Preparation of Polycarbonate Polyether Polyol 10 mg of the DMC-5 catalyst was put into a tube for catalyst injection, and then placed in a 160 ml high-pressure reactor. 10 mL of initiator PPG 400D was added to the reactor, and the reactor was bound. Thereafter, it was purged with nitrogen gas for 2 hours, and the reactor was heated to 105° to remove the initiator and moisture in the reactor as much as possible. A trace amount of carbon dioxide gas, 20 mL of cyclohexene oxide, and 10 mL of toluene were added to the reactor. Then, a vent line and an inlet were closed. After the reactor was heated to 115°, carbon dioxide gas was injected to increase the pressure of carbon dioxide in the reactor to 43.5 bars. When the temperature and pressure were stabilized, stirring was started, and polymerization was carried out for 3 hours. After 3 hours, the injection and heating of carbon dioxide gas were stopped, residual carbon dioxide gas in the reactor was removed, and the bound reactor was released to obtain a reaction product. The reaction product was diluted in toluene, and filtered through a filter paper to remove the catalyst. Then, after vacuum drying at 110° for 8 hours, a polycarbonate polyether polyol was obtained.

Examples 1 to 14 and Comparative Example 1 were tested for molecular weight, selectivity for carbonate, content of carbonate, yield, degree of unsaturation, and reaction rate, and the results therefrom are provided in Tables 1 to 3 below. In addition, a hydroxyl value and the number of functional group were measured in Examples 1 to 5, 10 to 14, and Comparative Example 1, and the results therefrom are provided in Tables 1 and 3. Polydispersity Index (PDI) was measured for Examples 6 to 9 and Comparative Example 1. The results therefrom are provided in Table 2.

Examples 1 to 5, and 10 to 14 described in Tables 1 and 3 were analyzed by using $^1$H-NMR spectroscopy (400 MHz Spectrometer, from Varian), since the molecular weights were relatively small. Examples 6 to 9 were analyzed by using gel permeation chromatography (THF-GPC), since the molecular weights were relatively high. The results therefrom are provided in Tables 1 to 3. On the other hand, the results of analyzing Comparative Example 1 by using $^1$H-NMR spectroscopy were described as Comparative Example 1-1, and the results of analyzing Comparative Example 1 analyzed by using gel permeation chromatography were described as Comparative Example 1-2.

The polycarbonate polyether polyols prepared in Examples 1 to 5, 10 to 14, and Comparative Example 1 were subjected to $^1$H-NMR spectroscopy (400 MHz Spectrometer, from Varian) of the polycarbonate to determine molecular weight, selectivity and content of the carbonate. The results therefrom are provided in Tables 1 and 3. Specifically, in the $^1$H-NMR spectroscopy, a carbonate peak appeared in the vicinity of about 4.5 ppm, an ether peak appeared in the vicinity of about 3.5 ppm, and a branch peak of the initiator appeared in the vicinity of about 0.8 ppm. Based on the above, molecular weight, selectivity and content of the carbonate were calculated by using equations 1 to 3 below, respectively.

$$\text{Molecular weight} = (\text{molecular weight of initiator}) + (\text{peak area of carbonate} * 10.5 * 142) + (\text{peak area of ether} * 10.5 * 98) \quad (1)$$

$$\text{Carbonate selectivity} = [(\text{peak area of carbonate}) / (\text{peak area of carbonate}) + (\text{peak area of ether})] * 100 \quad (2)$$

$$\text{Carbonate content} = \{(\text{calculated molecular weight} - \text{molecular weight of initiator}) / (\text{calculated molecular weight})\} * \text{carbonate selectivity} * (44/142) \quad (3)$$

Wherein 10.5 represents ratio of the number of hydrogen in the molecule, and 142, 98, 44, and 142 represent molecular weight of molecular repeating unit.

On the other hand, hydroxyl value was measured by ASTM E 1899-97 method, OHv unit was mgBu$_4$OH/g, and the number of functional groups corresponded to the hydroxyl value per molecule of the polycarbonate polyether polyol as a final product. The degree of unsaturation may be a ratio of ending with a double bond at terminals of the molecule. As the degree of unsaturation is lower, problems originated from side reaction of next reaction may be prevented, which may be measured by the ASTM-4671 method. The reaction rate was calculated, based on an amount (g) of the catalyst, and an amount (g) of end product per reaction time (h), and is provided in Tables 1 to 3 below.

TABLE 1

| | CATALYST | MOLECULAR WEIGHT (G/MOL) | CARBONATE SELECTIVITY (%) | CARBONATE AMOUNT (WT %) | HYDROXYL VALUE | NUMBER OF FUNCTIONAL GROUP | YIELD (G) | DEGREE OF UNSATURATION (MEQ/G) | REACTION RATE (G/G-CAT · HR) |
|---|---|---|---|---|---|---|---|---|---|
| COMPARATIVE EXAMPLE 1-1 | DMC-5 | 2,200 | 49 | 12 | 47.73 | 1.87 | 28 | 0.0212 | 1400 |
| EXAMPLE 1 | DMC-MEA | 1,800 | 58 | 14 | 76.35 | 2.45 | 25 | 0.0121 | 1666 |
| EXAMPLE 2 | DMC-EEA | 2,000 | 60 | 15 | 68.85 | 2.35 | 32 | 0.0079 | 1600 |
| EXAMPLE 3 | DMC-BEA | 2,400 | 52 | 13 | 49.80 | 2.13 | 27 | 0.0231 | 1350 |
| EXAMPLE 4 | DMC-DGEEA | 1,600 | 44 | 10 | 68.87 | 1.82 | 19 | 0.0197 | 950 |
| EXAMPLE 5 | DMC-EGD | 2,000 | 57 | 14 | 63.50 | 2.26 | 27 | 0.0201 | 1350 |

TABLE 2

| | CATALYST | MOLECULAR WEIGHT (G/MOL) | PDI | CARBONATE SELECTIVITY (%) | CARBONATE AMOUNT (WT %) | YIELD (G) | DEGREE OF UNSATURATION (MEQ/G) | REACTION RATE (G/G-CAT · HR) |
|---|---|---|---|---|---|---|---|---|
| COMPARATIVE EXAMPLE 1-2 | DMC-5 | 8,700 | 2.92 | 69 | 21 | 16 | 0.0190 | 266 |
| EXAMPLE 6 | DMC-MT | 19,700 | 2.06 | 54 | 17 | 15 | 0.0241 | 250 |
| EXAMPLE 7 | DMC-ET | 6,600 | 2.24 | 78 | 24 | 2 | 0.0156 | 33 |
| EXAMPLE 8 | DMC-BT | 16,000 | 2.06 | 60 | 19 | 8 | 0.0258 | 133 |
| EXAMPLE 9 | DMC-IPT | 14,200 | 2.12 | 62 | 19 | 6 | 0.0224 | 100 |

TABLE 3

| | CATALYST | MOLECULAR WEIGHT (G/MOL) | CARBONATE SELECTIVITY (%) | CARBONATE AMOUNT (WT %) | HYDROXYL VALUE | NUMBER OF FUNCTIONAL GROUP | YIELD (G) | DEGREE OF UNSATURATION (MEQ/G) | REACTION RATE (G/G-CAT · HR) |
|---|---|---|---|---|---|---|---|---|---|
| COMPARATIVE EXAMPLE 1-1 | DMC-5 | 2,200 | 49 | 12 | 47.73 | 1.87 | 28 | 0.0212 | 1400 |
| EXAMPLE 10 | DMC-MEA | 680 | 30 | 4 | 188.03 | 2.29 | 10 | 0.0121 | 333 |
| EXAMPLE 11 | DMC-EEA | 850 | 25 | 4 | 137.16 | 1.63 | 14 | 0.0079 | 466 |
| EXAMPLE 12 | DMC-BEA | 670 | 51 | 6 | 157.42 | 2.38 | 12 | 0.0231 | 400 |
| EXAMPLE 13 | DMC-DGEEA | 800 | 30 | 5 | 144.07 | 2.05 | 15 | 0.0197 | 500 |
| EXAMPLE 14 | DMC-EGD | 550 | 21 | 2 | 233.23 | 2.29 | 11 | 0.0201 | 366 |

While exemplary embodiments have been shown and described above, it will be apparent to those skilled in the art that modifications and variations could be made without departing from the scope of the present invention as defined by the appended claims.

The invention claimed is:

1. A double metal cyanide catalyst comprising a polyether compound, a metal salt, a metal cyanide salt, and an organic complexing agent having an acetate group.

2. The double metal cyanide catalyst according to claim 1, wherein the metal salt and the organic complexing agent are present in a weight ratio of 1:5 to 1:10.

3. The double metal cyanide catalyst according to claim 1, wherein the amount of the polyether compound is 0.1 to 30 parts by weight, based on 100 parts by weight of the double metal cyanide catalyst.

4. The double metal cyanide catalyst according to claim 1, wherein the organic complexing agent is selected from the group consisting of ethylene glycol monomethyl ether acetate (MEA), ethylene glycol monoethyl ether acetate (EEA), ethylene glycol monobutyl ether acetate (BEA), diethylene glycol monoethyl ether acetate (DGEEA), and ethylene glycol diacetate (EGD).

5. The double metal cyanide catalyst according to claim 1, wherein the polyether compound is a polyether polyol.

6. The double metal cyanide catalyst according to claim 5, wherein the polyether polyol is selected from the group consisting of poly(ethylene glycol), poly(propylene glycol), a block copolymer of ethylene oxide and propylene oxide, a butylene oxide polymer and a hyperbranched polyglycidol.

* * * * *